Aug. 29, 1950
F. V. TOOLEY
2,520,577
APPARATUS FOR MIXING MOLTEN GLASS
Filed Sept. 13, 1944
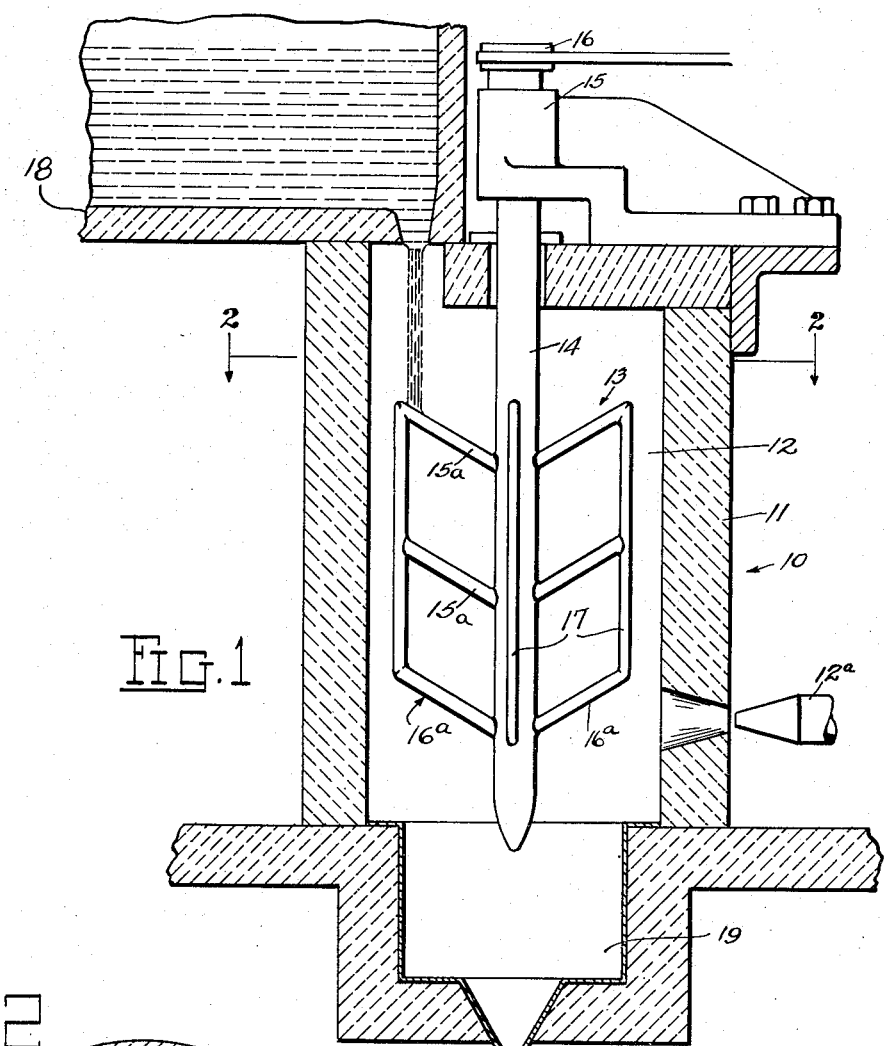
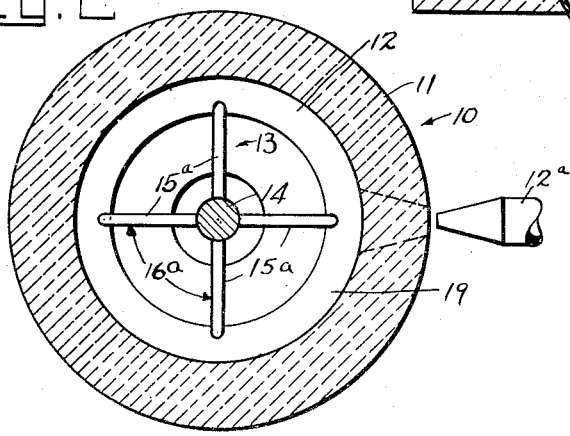
INVENTOR.
Fay V. Tooley
BY Staelin & Overman
Attorneys.

UNITED STATES PATENT OFFICE 2,520,577

APPARATUS FOR MIXING MOLTEN GLASS

Fay V. Tooley, Newark, Ohio, assignor to Owens-Corning Fiberglas Corporation, a corporation of Delaware Application September 13, 1944, Serial No. 553,915

4 Claims. (Cl. 49—55)

This invention relates to apparatus for mixing molten glass to increase the homogeneity of the glass.

The quality of many products formed of glass depends to large extent upon the homogeneity of the glass mixture. For example, in the manufacture of very fine glass fibers it is customary to draw the fibers from streams of molten glass flowing through small orifices of a feeder containing a body of molten glass. The uniformity of fiber diameter and the efficiency with which the glass may be attenuated into fibers depends largely on the quality of the particular glass, that is, the homogeneity of the molten material.

While most kinds of non-uniformities in the molten glass are detrimental to the fiber forming operation, the presence of large cords in the molten glass has probably the most serious consequences. The cords are usually much more viscous than the main body of molten glass so that when they reach the orifices of the feeder they may interrupt or greatly slow down flow of glass at one or more of the orifices with an attendant interference with attenuation and even an interruption of attenuation at those orifices. This necessitates stopping the entire operation and manually restarting proper flow of the streams from the affected orifice or orifices. This interruption or slowing down of flow at the orifices is caused by cords larger in cross-sectional area than the orifices, smaller cords ordinarily passing through the orifices without serious effect on the operation.

It is one object of this invention to increase the homogeneity of the glass to at least a point where the conversion of the glass to fine fibers is improved, by subjecting the molten glass to an agitating or stirring action which stretches or strings out the cords, tending to dissipate them and to substantially reduce their cross-sectional size.

Usual methods of stirring liquids have been found not to have the desired effect on molten glass. The high viscosity of molten glass makes extremely difficult the movement of the glass so that stirrers of conventional form are only slightly effective to intermix different portions of a body of glass, while nevertheless consuming great amounts of power to move the glass. Further, the highly viscous cords are more frequently merely displaced by conventional stirring operations rather than being actually dissipated or measurably thinned and lengthened out.

It is another object to dissipate and thin out the cords to substantial degree without the need for prolonged agitation of the molten glass and without the use of complex stirring operations or the consumption of large amounts of power. This is achieved by the simple expedient of imparting a folding or shearing action to small cross-sections of the glass.

The foregoing, as well as other objects, will be made more apparent as this description proceeds, especially when considered in connection with the accompanying drawing, wherein:

Figure 1 is a diagrammatic sectional view of one type of equipment capable of producing the results noted above; and Figure 2 is a cross-sectional view taken substantially on the plane indicated by the line 2—2 of Figure 1.

In Figure 1 of the drawings the reference character 10 designates a mixer for molten glass having a main body portion 11 having therein a chamber 12 lined with a suitable heat resistant material and having a cage 13 supported for rotation therein about a vertical axis. The chamber may be heated in any suitable manner as by means of a gas burner 12a. The cage 13 is carried by a shaft 14 having its upper end journaled in a bearing 15 suitably fixed with respect to the body 11 and having a pulley 16 secured thereto above the bearing to permit operatively connecting the shaft to a suitable prime mover (not shown).

The cage shown in the drawing for the purpose of illustration comprises arms 15a arranged in four sets 16a equidistantly angularly spaced about the shaft 14, the arms projecting outwardly as well as upwardly from the shaft 14. Each set of arms is made up of three arms spaced equidistantly axially of the shaft 14, and the outer ends of the arms of each set are connected together by a mullion or brace 17. While the present embodiment is represented as employing four sets of three arms each, the number of sets and the arms in the sets may be varied if desired to increase or decrease the mixing effect. More sets and arms have the effect of increasing the mixing while less decrease the effect of mixing.

Most advantageously the cage 13 and the shaft 14 are of metal or are metal coated so that the glass as it is being acted upon by the cage does not contact ceramic materials which might dissolve in the glass and create new inhomogeneities. For this reason, the cage and the shaft are preferably formed of a heat resistant metal such as platinum or platinum alloy. Alternatively, the shaft may be formed of a steel-reinforced refractory ceramic material, for example, sillimanite, coated with platinum or the like, the cage being formed of metal for the sake of ease in manufacture.

A container for a supply of molten glass is indicated in Figure 1 by the reference character 18 and comprises a portion extending over the top of the chamber 12. The container may be part of or have communication with the melting or refining section of an ordinary glass tank. A discharge opening is formed in the bottom of the container in a position to flow a stream of molten glass into the chamber 12 in a path intersecting the circular path of movement of the arms 16a, preferably near the outer ends of the arms.

As the stream of glass flows downwardly into the chamber 12, the arms 15a of each set of arms on the rotating cage 13 successively intersect the path of travel of the molten glass stream. The arms 15a revolve at a relatively slow rate, say from 30 to 60 R. P. M., determined with respect to the viscosity of the glass.

The mixing action resulting from operation of the cage on the stream may be described generally as the creation of a differential velocity of portions of the molten glass so that different portions of the glass are actually displaced with relation to each other. This relative displacement of portions of the glass is accomplished by dividing the glass into a plurality of discrete bodies and then recombining the bodies in such a way that they are greatly displaced relative to each other with reference to their original position in the body of molten glass. The cords in the glass are first strung out and arranged to extend all in the same direction and the division of the molten glass is in directions transverse to the direction of the cords so that the cords are greatly reduced in length. The cords of reduced length are then attenuated to provide a glass in which any cords present are of such fineness that for all practical purposes in usual forming operations the glass is highly homogeneous.

This mixing is effected in the following manner. The molten glass is flowed from the orifice in the container 18 at ordinary viscosities so regulated that the molten glass wets the metal surfaces of the cage 13. As the cage revolves the stream engages one of the arms 15a and for the short time the arm is in the path of the stream the glass collects in a globe on the arm. As this first arm moves away from the path of the stream the globe is carried away and the stream loops down between that arm and the second or next adjacent arm. The loop continues to elongate as the cage rotates, due primarily to continued stream flow, until the stream is engaged by the second arm, when the glass collects on the second arm in a globe. Shortly preceding or shortly subsequent to engagement of the stream by the second arm, the loop of the stream intermediate the two adjacent arms draws out under the action of gravity and parts, and one half of what was the loop of molten glass contacts the two bars aligned with the first arm and the other half of what was the loop falls into contact with the two bars beneath the second arm. The molten glass stream is thus draped over the sets of vertically aligned arms as the cage rotates.

The glass on each set of arms flows downwardly and, due to the inclination of the arms, toward the shaft supporting the cage and while so flowing divides into three globes one on each of the arms. When the molten glass on each arm reaches the shaft it joins molten material flowing from others of the arms, and the glass recombines into a single stream flowing over the shaft and flows from the lower end of the shaft into any suitable receptacle, for instance, a feeder represented as a metal-lined container 19.

The molten glass flowing from the end of the shaft instead of being received in the container 19 may be fed directly into forming apparatus to be formed into patties or marbles or other forms of cullet for later melting and conversion into glass fibers or other products. Preferably the glass flowing from the end of the shaft is collected in a receptacle, collection in this way causing some additional mixing due to the folding of the stream into the body of glass in the receptacle.

In this method of operation, cords present in the molten material in the container 18 are first attenuated by the narrowing down of the body of glass as it flows from the bottom of the container in a relatively small stream, which preferably is about one-half inch diameter at a point six inches below the orifice. Flowing the glass in a stream also rearranges the cords to extend all in the same direction, that is, lengthwise of the stream. Then the attenuated cords are cut into smaller lengths as the molten glass festoons over each set of vertically aligned arms, and finally each of these divisions of the cords is subdivided into three portions by collection of the molten glass on the individual arms of each set of vertically aligned arms. As a result, an original length of the stream of molten glass corresponding roughly to the circumference of the cage is first divided into four parts by being festooned over the sets 16a of arms and each of these parts is again divided into three parts so that the original length of stream has been divided into twelve parts. The attenuated cords extending through this length of stream have of course likewise been divided into twelve parts and as the molten glass on the cage recombines the short attenuated cords are intermixed and dispersed. The shortened cords are again attenuated as the stream narrows down and elongates in flowing from the lower end of the shaft 14. What originally may have been thick discrete cords in the glass in the receptacle 18 are reduced by this mixing process to at least very fine evenly dispersed cords in the body of glass collected in the chamber 19 and many of the cords have been substantially dissipated.

In subsequent operations where the glass is formed into finished articles, these fine evenly dispersed cords remaining in the glass do not have any substantial effect on the operations. For example, in conversion of the glass into fibers, the glass may be flowed through very small orifices, the fine attenuated cords passing freely through the orifices so that for all practical purposes the glass is completely homogeneous.

Various changes and modifications may be resorted to within the spirit of the invention and the scope of the claims.

I claim:

1. Apparatus for mixing molten glass comprising means for flowing a stream of molten glass, a shaft disposed beneath said means and supported for rotation about an axis extending in the same general direction as and spaced laterally from the normal path of the stream of molten glass, a series of angularly spaced arms projecting outwardly from the shaft and being inclined inwardly and downwardly toward the shaft, and means for rotating said shaft and moving said arms in circular paths intersecting the path of normal flow of the stream to thereby collect the glass of the stream in a plurality of discrete bodies on said arms which flow toward the shaft and there recombine.

2. Apparatus for mixing molten glass comprising means for flowing a stream of molten glass, a shaft disposed beneath said means and supported for rotation about an axis extending in the same general direction as and spaced laterally from the normal path of the stream of molten glass, said shaft being provided with a plurality of series of arms with the series spaced apart angularly of the shaft, the arms of a series being spaced apart axially of the shaft and each arm projecting outwardly from the shaft and being inclined inwardly and downwardly toward the shaft, and means for rotating said shaft and moving said arms in circular paths intersecting the path of normal flow of the stream to thereby collect the glass of the stream in a plurality of discrete bodies on said arms which flow toward the shaft and there recombine.

3. Apparatus for mixing molten glass comprising means for flowing a stream of molten glass, a shaft disposed beneath said means and supported for rotation about an axis extending in the same general direction as and spaced laterally from the normal path of the stream of molten glass, said shaft being provided with a plurality of series of arms with the series spaced apart angularly of the shaft, the arms of a series being spaced apart axially of the shaft and each arm projecting outwardly from the shaft and being inclined inwardly and downwardly toward the shaft, said arms and shaft being surfaced with heat-resistant metal wettable by the molten glass, means for rotating said shaft and moving said arms in circular paths intersecting the path of normal flow of the stream to thereby collect the glass of the stream in a plurality of discrete bodies on said arms which flow toward the shaft and there recombine, and a receptacle beneath the lower end of the shaft to receive the molten glass flowing from the shaft.

4. Apparatus for mixing molten glass comprising means for flowing a stream of molten glass, a shaft supported for rotation about an axis extending in the same general direction as and spaced laterally from the normal path of the stream of molten glass, a plurality of sets of arms spaced from each other angularly of the shaft and rotatable as a unit with the shaft to successively intersect the path of normal flow of the stream of glass, the arms in each set being spaced from each other axially of the shaft and being inclined upwardly and outwardly from the shaft to guide the molten glass collected thereby downwardly and inwardly toward the shaft, and means for rotating the shaft and arms at a rate so related to the viscosity of the glass as to enable the molten glass to form downwardly extending loops between adjacent arms in the same set.

FAY V. TOOLEY.

REFERENCES CITED

The following references are of record in the file of this patent:

UNITED STATES PATENTS

| Number | Name | Date |
| --- | --- | --- |
| 872,729 | Hiller | Dec. 3, 1907 |
| 1,479,511 | Parsons | Jan. 1, 1924 |
| 1,560,826 | Kirschbraun | Nov. 10, 1925 |
| 1,587,986 | Peiler | June 8, 1926 |
| 1,884,427 | Wardley | Oct. 25, 1932 |
| 1,986,575 | Honiss | Jan. 1, 1935 |
| 2,128,249 | Honiss | Aug. 30, 1938 |
| 2,212,448 | Modigliani | Aug. 20, 1940 |
| 2,225,369 | Danner | Dec. 17, 1940 |
| 2,305,739 | Shackelford | Dec. 22, 1942 |
| 2,335,386 | Brady | Nov. 30, 1943 |

FOREIGN PATENTS

| Number | Country | Date |
| --- | --- | --- |
| 217,171 | Switzerland | Jan. 16, 1942 |
| 505,934 | Great Britain | May 19, 1939 |